United States Patent [19]

Kanemitsu et al.

[11] Patent Number: 4,636,065

[45] Date of Patent: Jan. 13, 1987

[54] MOLDED ARTICLE WITH FLEXIBLE HINGE

[75] Inventors: Shinji Kanemitsu, Ichikawa; Hiroshi Nitanda, Tokyo, both of Japan

[73] Assignee: Canon Kabushiki Kaisha, Tokyo, Japan

[21] Appl. No.: 671,460

[22] Filed: Nov. 14, 1984

[30] Foreign Application Priority Data

Nov. 25, 1983 [JP] Japan .................... 58-222601
Nov. 25, 1983 [JP] Japan .................... 58-222632

[51] Int. Cl.⁴ .................................... G03B 27/62
[52] U.S. Cl. ........................... 355/75; 16/DIG. 13
[58] Field of Search ............. 355/75, 25; 16/DIG. 13

[56] References Cited

U.S. PATENT DOCUMENTS 3,615,035 10/1971 Newton .................... 16/DIG. 13
4,466,736  8/1984 Masaki ............................ 355/75

FOREIGN PATENT DOCUMENTS 686700  3/1965  Italy ........................... 16/DIG. 13

Primary Examiner—Monroe H. Hayes
Attorney, Agent, or Firm—Fitzpatrick, Cella, Harper & Scinto

[57] ABSTRACT

This specification discloses a molded article, for example an original document cover plate for use in a copier, composed of a flexible hinge portion and a pair of solid portions faced across the hinge portion, and adapted to be folded at the hinge portion. The hinge portion has a structure to avoid stress concentration on the end areas in the width direction of the hinge portion.

24 Claims, 23 Drawing Figures

MOLDED ARTICLE WITH FLEXIBLE HINGE

BACKGROUND OF THE INVENTION

1. Field of the Invention

The present invention relates to a molded article with a flexible hinge, and more particularly to an improvement in a molded article having a relatively thin and flexible hinge portion and adapted to be folded at the flexible hinge portion.

An example of such molded article is an original document cover plate for use in a copier, which will be taken as an example in the following description, but the present invention is not limited to such an example.

2. Description of the Prior Art

At first, reference is made to FIGS. 1 and 2 for briefly explaining the structure of a copier 1 in which the present invention is applicable. An original document cover plate 2 is integrally molded, including hinge portions 2a, 2b and a grip 2e, for example with a polypropylene resin, and is mounted at an end thereof to the main body of the copier. There is provided an original document pressing plate 3 composed of a cushioning material such as Moltoprene (a trade name), on which is adhered a white sheet 4. There are further shown a transparent plate (glass) 6 for placing the original document, a rail 7 for guiding the sliding movement of an original carriage including said glass plate 6, a plate member 8 for supporting said rail 7, and a rail 9 for supporting said glass plate 6.

As shown in FIG. 3, the original document cover plate 2 can be raised to an open position by folding at the hinge portion 2a and is maintained at this position by mutual contact of solid portions 2a2 and 2a3 (cf. FIG. 4) adjacent to the hinge portion 2a. A similar contact of solid portions also takes place in the hinge portion 2b to maintain the illustrated position. An original document P to be copied is placed on the glass plate 6, and then the original document cover plate 2 is pulled down to press said original document P, thus preparing for the copying operation. Such structure as explained in the foregoing is disclosed in U.S. Pat. No. 4,466,736, corresponding to Japanese Utility Model Laid-Open No. 190539/1982.

The hinge portions 2a, 2b are required to have an elevated strength, particularly durability against repeated use, because the original document cover plate 2 is subjected to frequent opening and closing operations.

However, the conventional original document cover plate 2, having a structure as shown in detail in FIG. 4, is insufficiently durable for repeated use.

More specifically, the conventional hinge portion 2a (same also for 2b) which is composed of a film-like thin flat bending portion 2a1 and a pair of solid portions 2a2, 2a3 in a generally U-shaped arrangement, has the same cross-section in any position (cf. FIG. 5) so that the stress tends to concentrate on the ends a, b of the junctions between the bending portion 2a1 and the solid portions 2a2, 2a3 when a force in a direction indicated by an arrow A in FIG. 3 is applied to the original document cover plate.

This phenomenon will be explained further in the following, with reference to FIGS. 6 and 7. The external force in the direction of arrow A applies a rotational force to the solid portion 2a3 around a contact point c, so that the bending portion 2a1 is subjected to a tension in a direction d. If the applied force is evenly distributed over the entire width of the hinge portion 2a so that the strength of the hinge portion depends on the properties of the material of which it is constructed, will not be broken by normal manipulations or by a slight shock. In practice, however, the external force in the direction A is not evenly applied to the entire hinge portion 2a but is often applied to a limited part of the original document cover plate 2, for example as the grip 2e thereof is positioned at the left-hand end of the cover plate as shown in FIG. 1. Also, in a structure in which any position of the cover plate may be used as the grip, it will be natural to expect the generation of an uneven load. In the presence of such an uneven load, the bending portion 2a1 is subjected not only to a simple tensile force as shown in FIG. 6 but also to a torsion which generates a shearing force J at the ends a, b of the junctions as shown in FIG. 7 in which the hinge portion is seen longitudinally. Consequently the stress is concentrated on a scar, if one is present close to the ends a, b of junctions, causing tears, or, even in the absence of such a scar, it causes whitening in the junctions between the bending portion 2a1 and the solid portions 2a2, 2a3 because of a rapid change in the molded shape, thus weakening the structure and eventually causing tears.

SUMMARY OF THE INVENTION

In consideration of the foregoing, an object of the present invention is to provide a molded article provided with a flexible hinge having a high resistance to tearing.

In the molded article of the present invention the durability of the flexible hinge is improved by a structure capable of avoiding the concentration of stress on the end areas of the flexible hinge.

More specifically, in a molded article which is provided with a flexible hinge portion and a pair of solid portions mutually opposed across said flexible hinge and in which the solid portions contact with each other when said article is folded at the flexible hinge, there is employed a structure in which the solid portions do not mutually contact in the vicinity of end areas in the width direction of the solid portions, whereby a tensile force is applied to the flexible hinge only in the central area but not in the end areas, and the end areas of the flexible hinge are therefore freed from the shearing force.

Also, in a molded article which is provided with a flexible hinge portion and a pair of solid portions mutually opposed across said flexible hinge and in which said solid portions mutually contact when said article is folded at said flexible hinge, there is employed a structure in which an additional slack is given to the vicinity of the end areas of the flexible hinge in the width direction thereof compared to other areas of the hinge, whereby a tensile force is applied to said other areas but not to the end areas because of said additional slack, and the end areas of the flexible hinge is therefore free of the shearing force.

DETAILED DESCRIPTION OF THE PREFERRED EMBODIMENTS

Now the present invention will be clarified in detail by reference to the embodiments shown in the attached drawings.

Figure 8:
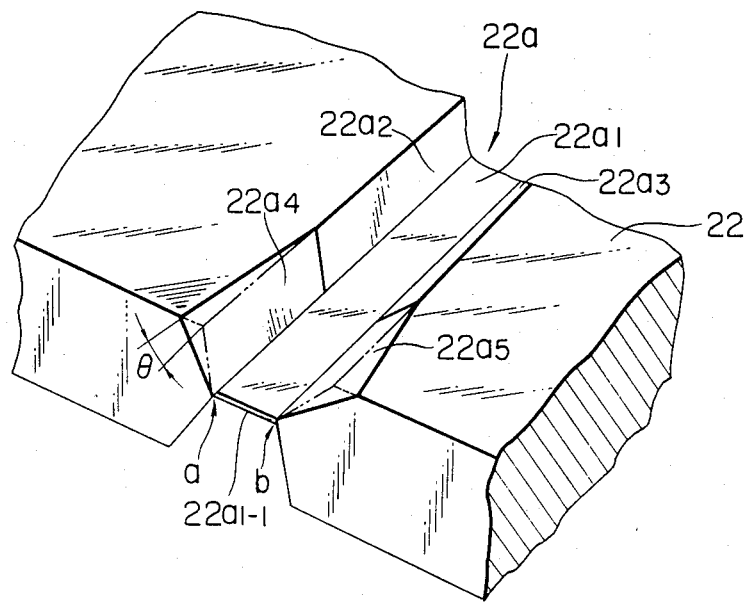
FIG. 8 is a perspective view of an embodiment of the molded article of the present invention.

FIG. 8 is a perspective view of the principal part of the original document cover plate 22 showing a first embodiment of the present invention. In the drawing, a hinge portion 22a is composed of a film-like thin bending portion 22a1, and a pair of solid portions 22a2, 22a3 and a pair of solid portions 22a4, 22a5, which pairs face each other across the bending portion 22a1, respectively. The solid portions 22a2, 22a3 positioned in the central area are parallel to each other while the solid portions 22a4, 22a5 positioned in the end areas of the original document cover plate in width are set back at an angle θ to said solid portions 22a2, 22a3.

Figure 1:
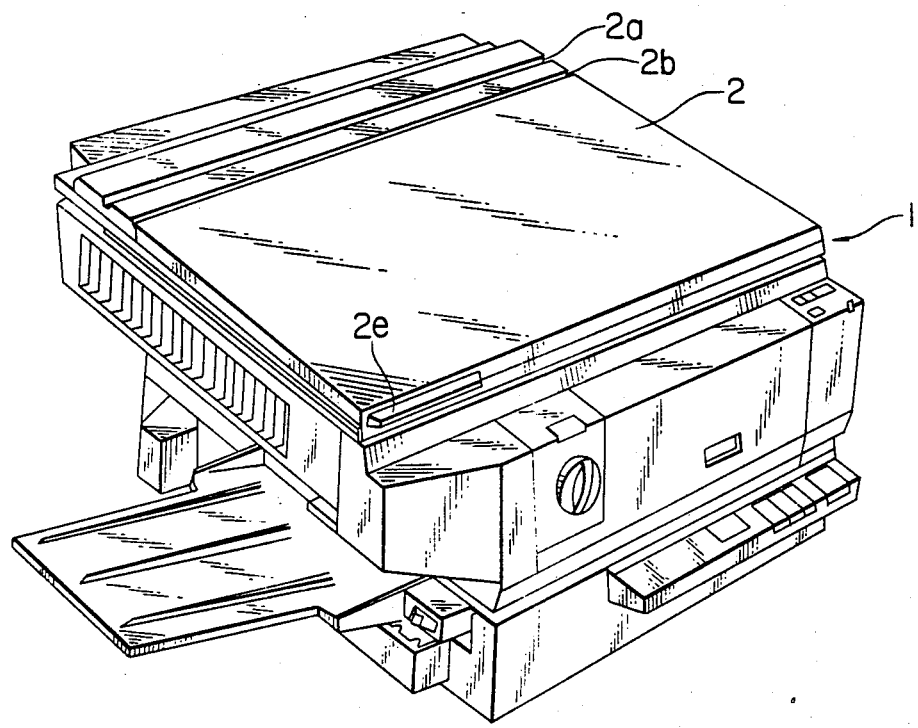
FIG. 1 is a perspective view of a copier.
Figure 2:
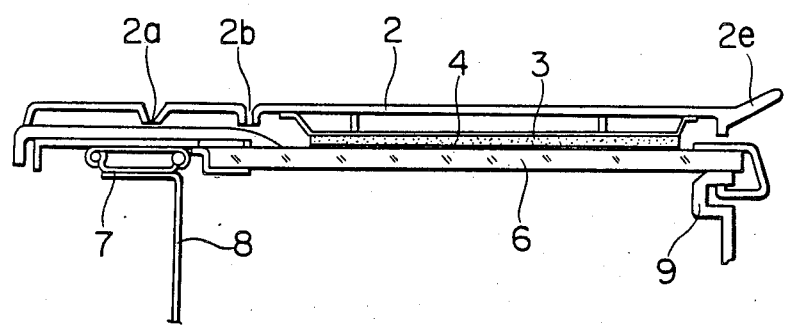
FIG. 2 is a schematic longitudinal cross-sectional view of a part of the copier shown in FIG. 1.
Figure 3:
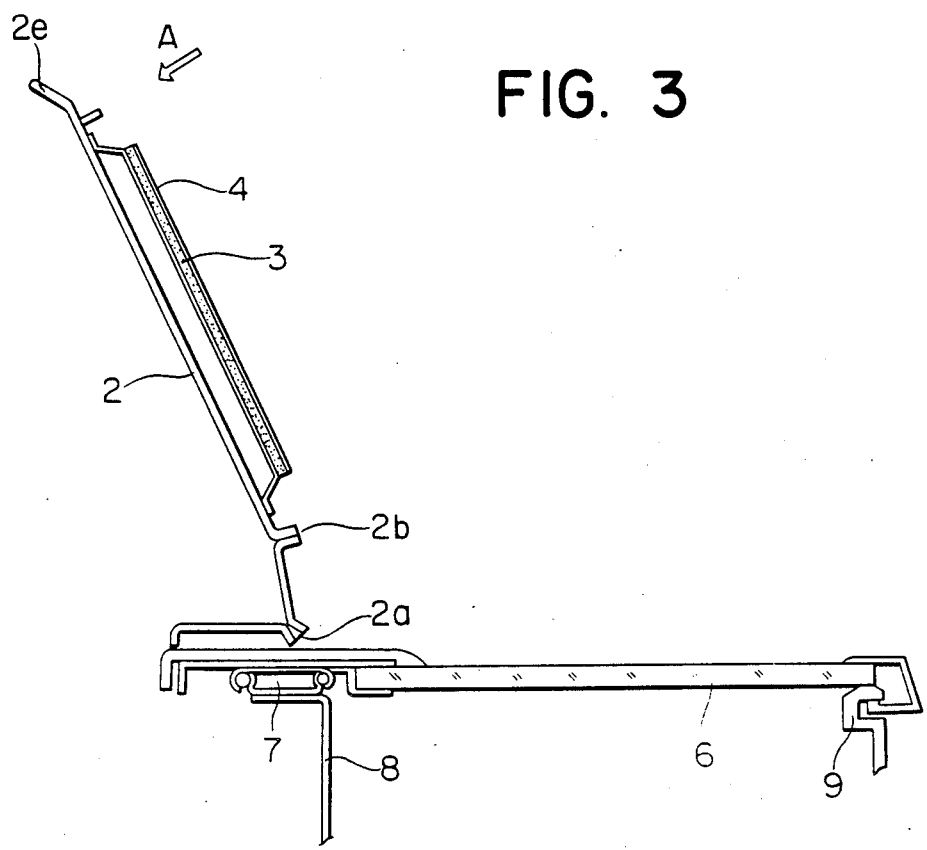
FIG. 3 is a longitudinal cross-sectional view of the structure shown in FIG. 2 after operation.
Figure 4:
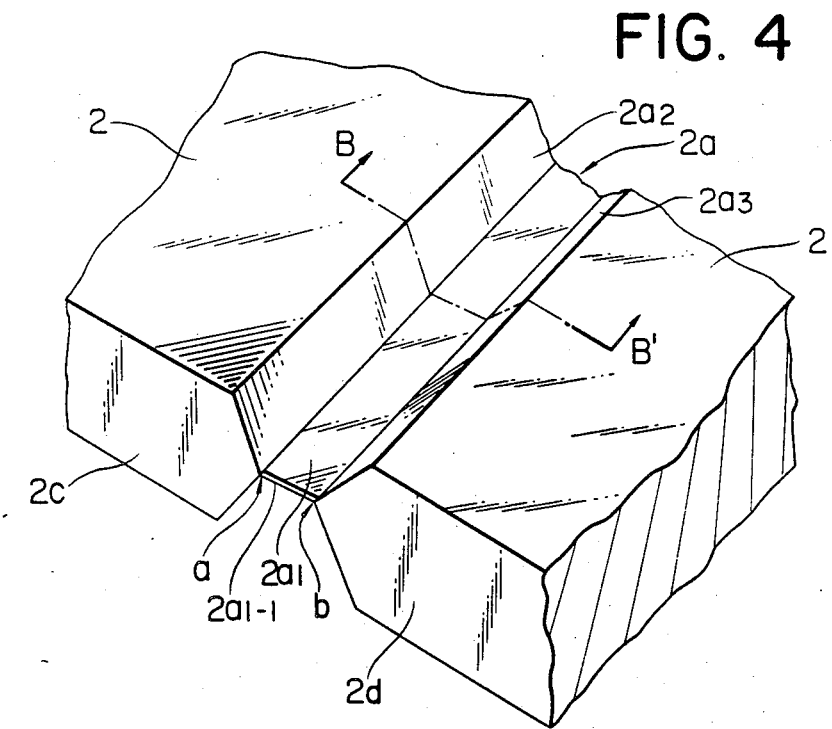
FIG. 4 is a perspective view of a molded article having a conventional flexible hinge.
Figure 5:
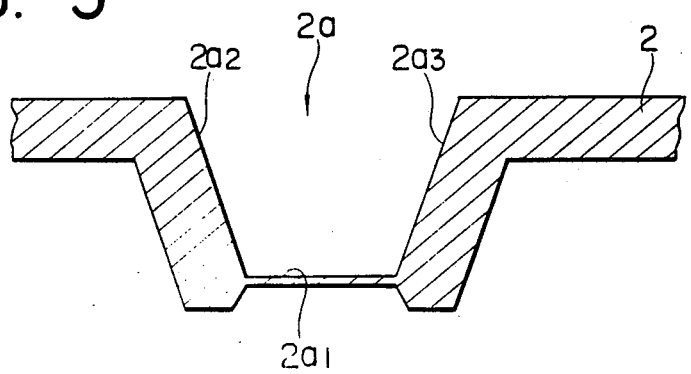
FIG. 5 is a cross-sectional view seen in a direction B-B' shown in FIG. 4.
Figure 6:
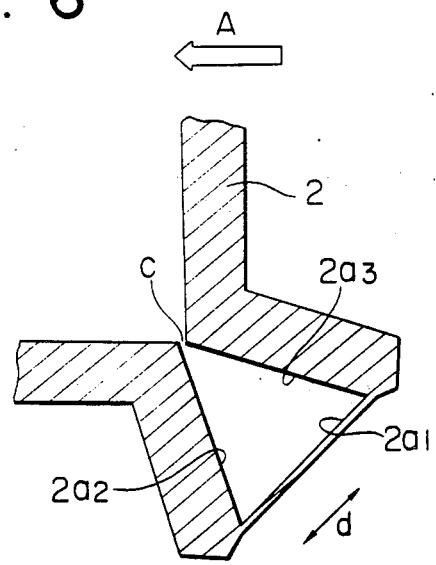
FIG. 6 is a cross-sectional view of the flexible hinge a state where the original document cover plate is opened.
Figure 7:
FIG. 7 is a schematic view showing the state of the flexible hinge under a torsion.

Thus, when a force in the direction A shown in FIG. 3 is applied to the original document cover plate in its standing position, a tensile force in the direction d as shown in FIG. 6 is applied to the central area of the bending portion 22a1 neighboring to the solid portions 22a2, 22a3, but the force is not applied to the end areas of the bending portion 22a1, because the solid portions 22a4, 22a5 do not contact each other, so that the moment around the contact point shown in FIG. 6 no longer occurs. Consequently, the shearing force is not applied to an end face 22a-1 (particularly the corners a, b thereof) of the bending portion 22a1.

Figure 9:
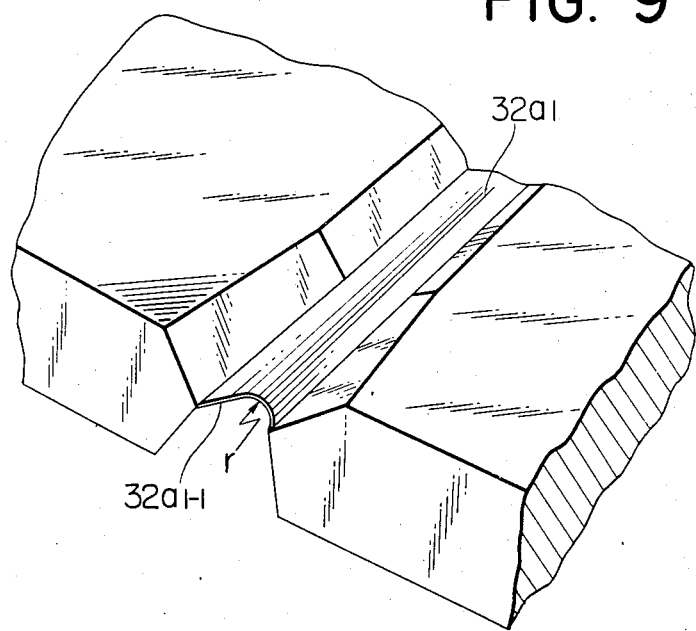
FIG. 9 is a perspective view showing a variation of the molded article shown in FIG. 8.

FIG. 9 shows a variation of the structure shown in FIG. 8, wherein the end face 32a1-1 of the bending portion is formed as an arc with a radius r to avoid the concentration of stress on the end face 32a1-1.

Figure 10:
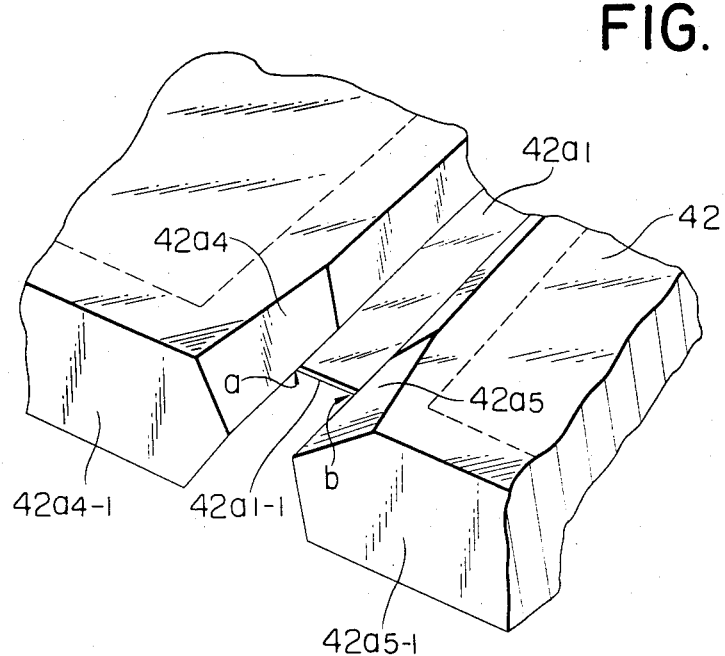
FIG. 10 is a perspective view of a second embodiment of the molded article of the present invention.

FIG. 10 is a perspective view of a second embodiment which has, in addition to the feature of the embodiment shown in FIG. 8, a feature that the end face 42a-1-1 of the bending portion 42a1 ends short of, and thus is recessed relative to, the end faces 42a4-1, 42a5-1 of the solid portions 42a4, 42a5. This feature is particularly effective when the original document cover plate 42 is thickened at its periphery. In this arrangement, even if a tensile force is generated at the periphery due to an insufficient shaping of the solid portions 42a4, 42a5, the shearing force is not applied to the end face of the bending portion, since the bending portion is absent where the solid portions are relatively thick and rigid. On the other hand, the tensile force applied to the bending portion 42a1 is limited within a reasonable range because the solid portions adjacent to the end face 42a1-1 of the bending portion 42a1 are relatively thin and therefore flexible. In this manner, no shearing force is applied to the junctions a, b of the end face 42a1-1.

Figure 11:
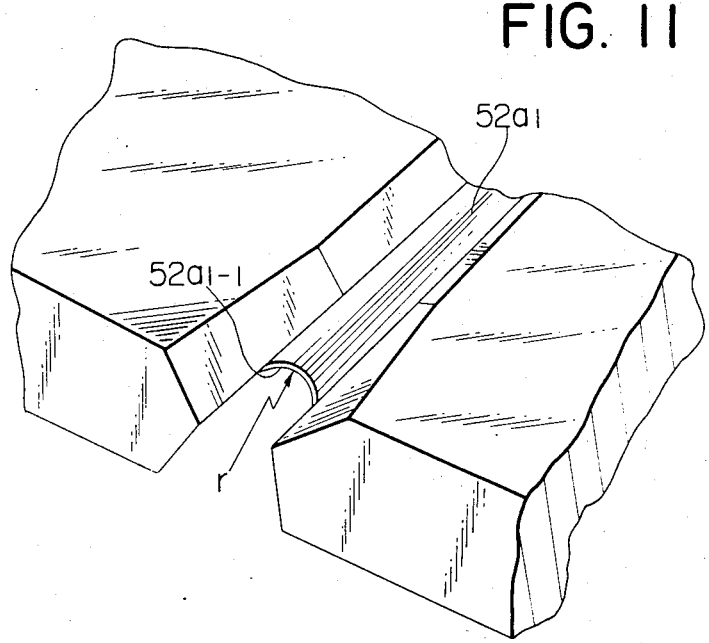
FIG. 11 is a perspective view showing a variation of the molded article shown in FIG. 10.

FIG. 11 shows a variation of the structure shown in FIG. 10, wherein the end face 52a1-1 of the bending portion 52a1 is formed as an arc of a radius r to avoid the concentration of stress on said end face 52a1-1.

Figure 12:
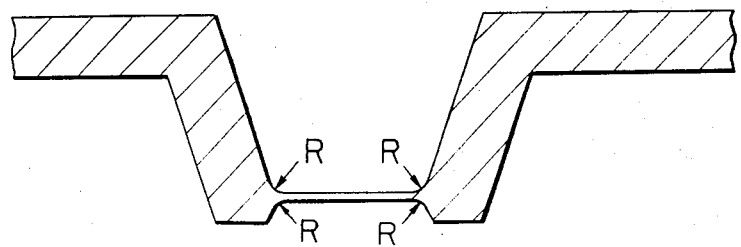
FIG. 12 is a cross-sectional view showing another variation.

FIG. 12 shows another variation in which the corners R connecting the solid portions and the bending portion are rounded to avoid the concentration of stress on the corners.

Figure 13:
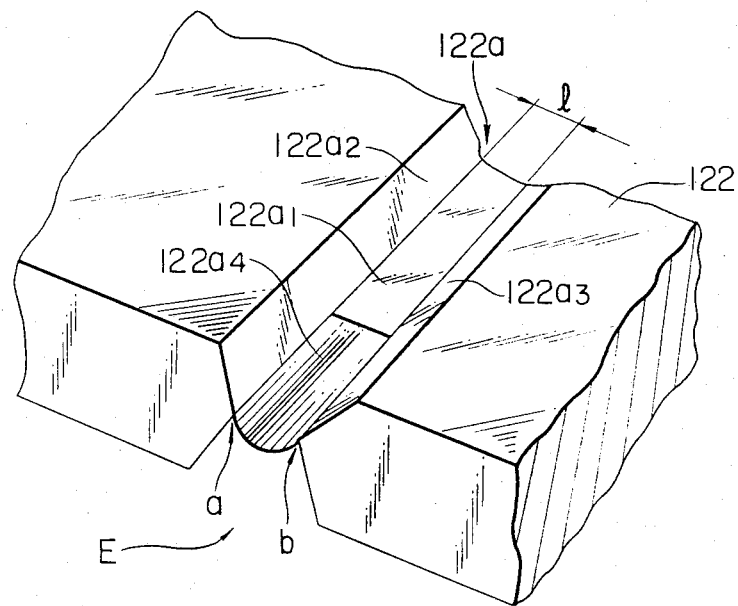
FIG. 13 is a perspective view of a third embodiment of the molded article of the present invention.
Figure 14:
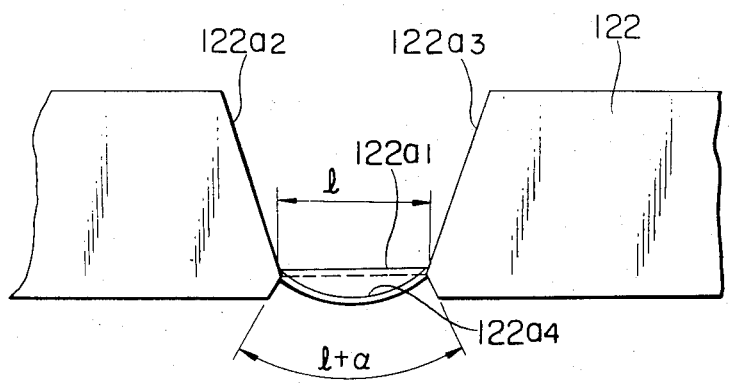
FIG. 14 is a side view seen from a direction E shown in FIG. 13.

FIG. 13 is a perspective view of the principal part of the original document cover plate 122 showing a third embodiment of the present invention, and FIG. 14 is a side view seen from a direction E shown in FIG. 13, wherein a hinge portion 122a is composed of a film-like thin bending portion 122a1, solid portions 122a2, 122a3 and a bridge-shaped slack bending portion 122a4 constituting an extention of the bending portion 122a1. As also shown in FIG. 14, the original document cover plate of the present embodiment is constructed such that the developed length (l+α) of the bending portion 122a4 is greater than the length l of the bending portion 122a1. Accordingly, even if the tensile force d as shown in FIG. 6 is applied to the bending portion 122a1, it is not applied to the bending portion 122a4 because of the slack. Consequently, the shearing force is not imposed on the junctions a, b of the bending portion 122a4.

Figure 15:
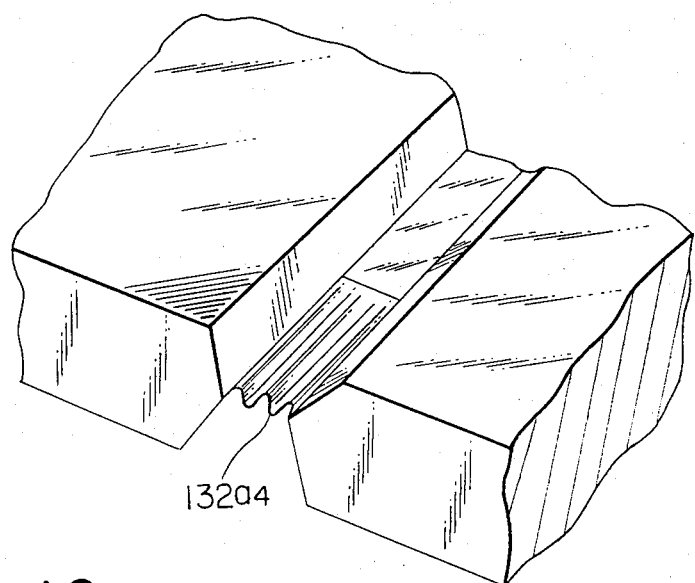
FIGS. 15 and 16 are perspective views showing variations of the molded article shown in FIG. 13.
Figure 16:
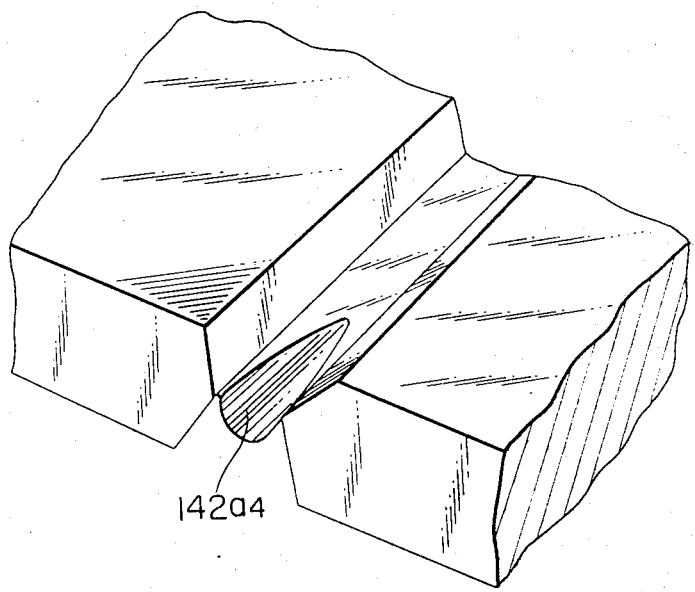

FIGS. 15 and 16 show variations of the structure shown in FIG. 13. The variation shown in FIG. 15 has a corrugated bending portion 132a4 in place of the bridge-shaped slack bending portion 122a4, and the variation shown in FIG. 16 has a conically shaped bending portion 142a4.

Figure 17:
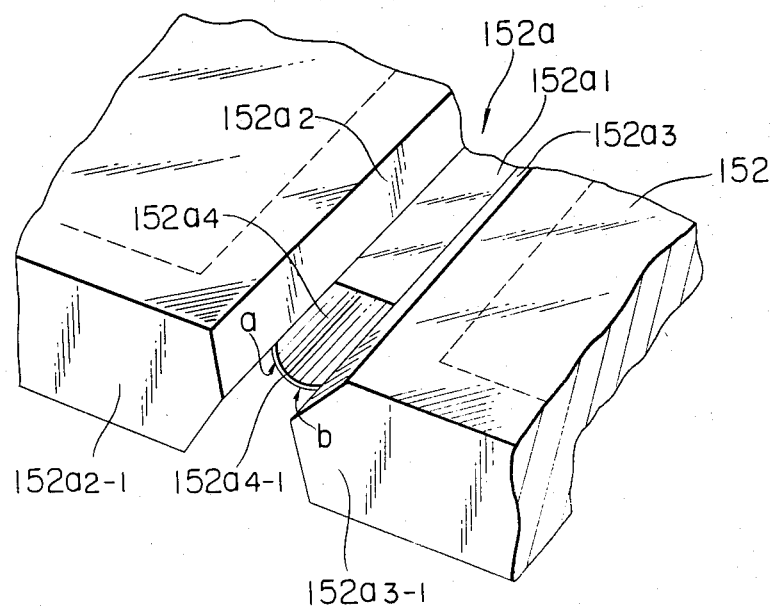
FIG. 17 is a perspective view of a fourth embodiment of the molded article of the present invention.

FIG. 17 is a perspective view of the principal part of an original document cover plate 152 showing a fourth embodiment of the present invention, which is different from the third embodiment shown in FIG. 13 in that the end face 152a4-1 of the bending portion 152a4 is recessed relative to the end faces 152a2-1, 152a3-1 of the solid portions 152a2, 152a3 of the original document cover plate. This feature is particularly effective when the original document cover plate is thickened at its periphery. In the arrangement, even if a tensile force is generated at the periphery due to insufficient slack, the bending portion itself is absent where the solid portions are relatively thick and therefore rigid. Thus, the shearing force is not imposed on the junctions a, b of the bending portion 152a4. On the other hand, the solid portions adjacent to the end face 152a4-1 of the bending portion 152a4 are relatively thin and flexible, so that the tensile force applied to the bending portion 152a4 is limited within a reasonable range. Consequently the shearing force is not imposed on the junctions a, b.

In this embodiment, the bridge-shaped slack of the bending portion may be replaced by the corrugated shack as shown in FIG. 15 or by the conical slack as shown in FIG. 16.

Figure 18:
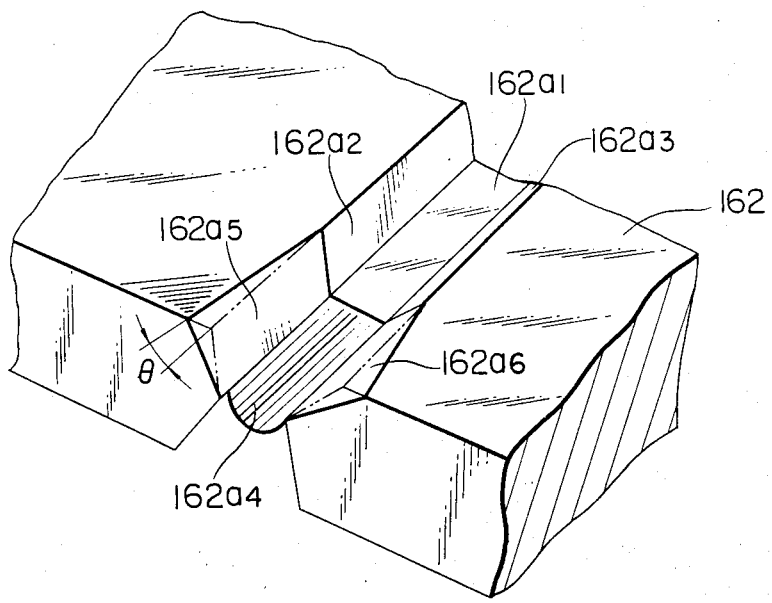
FIG. 18 is a perspective view of a fifth embodiment.

FIG. 18 is a perspective view of a fifth embodiment, which is provided, in addition to the feature of the embodiment shown in FIG. 13, with an additional feature that solid portions 162a5, 162a6 are inclined at the end areas in the width direction. The solid portions 162a5, 162a6 are set back at an angle θ to the solid portions 162a2, 162a3.

Thus, when the force in the direction A shown in FIG. 3 is applied to the original document cover plate in its standing position, the tensile force in the direction d as shown in FIG. 6 is applied to the bending portion 162a1 adjacent to the solid portions 162a2, 162a3, but it is not applied to the bending portion 162a4. This is because the solid portions 162a5 and 162a6 do not contact with each other so that the moment around the contact point C shown in FIG. 6 is no longer present.

Figure 19:
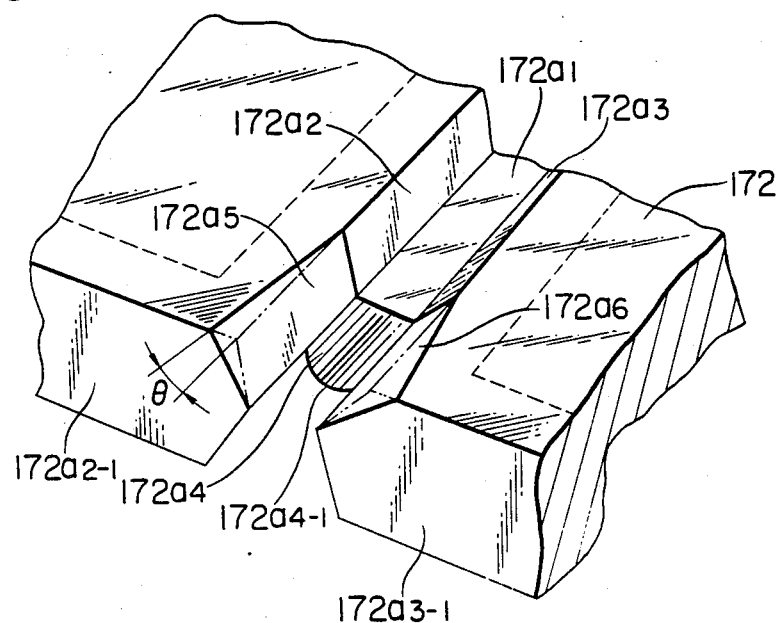
FIG. 19 is a perspective view of a sixth embodiment.

FIG. 19 is a perspective view of a sixth embodiment which is provided, in addition to the feature of the embodiment shown in FIG. 18, with an additional feature that the end face 172a4-1 of the bending portion 172a4 is ended or recessed inside of the end faces 172a2-1, 172a3-1 of the solid portions 172a2, 172a3 of the original document cover plate. The effect of said feature is same as that of the embodiment shown in FIG. 17.

Figure 20:
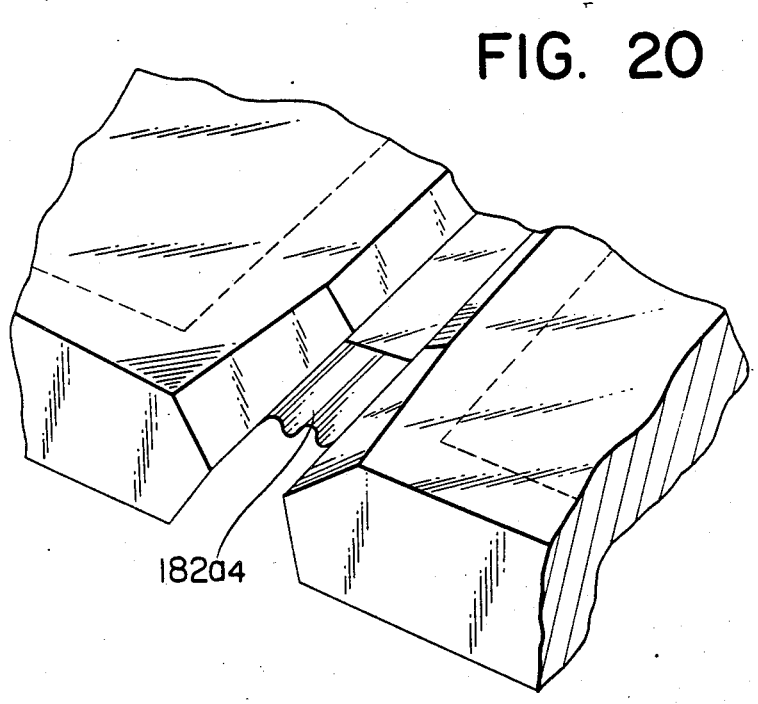
FIGS. 20 to 22 are perspective views showing variations of the molded article shown in FIG. 19.
Figure 21:
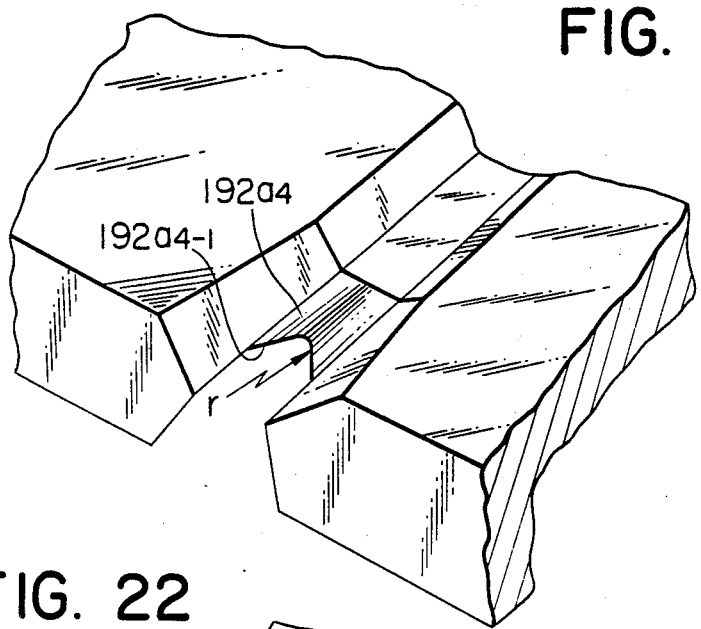
Figure 22:
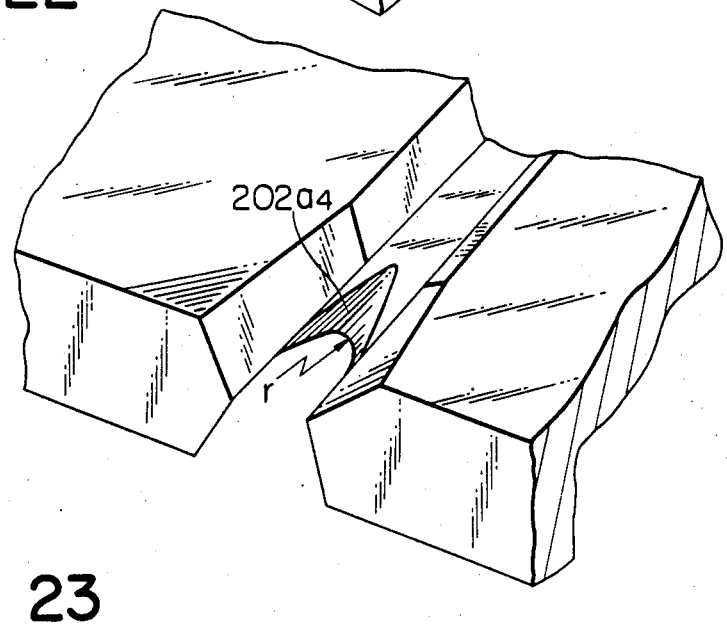

FIGS. 20, 21 and 22 show variations of the embodiment shown in FIG. 19. The variation shown in FIG. 20 employs a corrugated slack in the bending portion 182a4 instead of the bridge-shaped slack bending portion 172a4. The variation shown in FIG. 21, has an arc-shaped end face 192a4-1 with a radius r in the bridge-shaped slack bending portion 192a4, and further the variation shown in FIG. 22 employs a conically shaped slack bending portion 202a4 instead of the bridge-shaped slack bending portion 192a4 in FIG. 21.

The arc-shaped end face of the bending portion has an effect on avoiding stress concentration on the end face and is also applicable to the embodiments shown in FIGS. 13 and 15 to 18.

Figure 23:
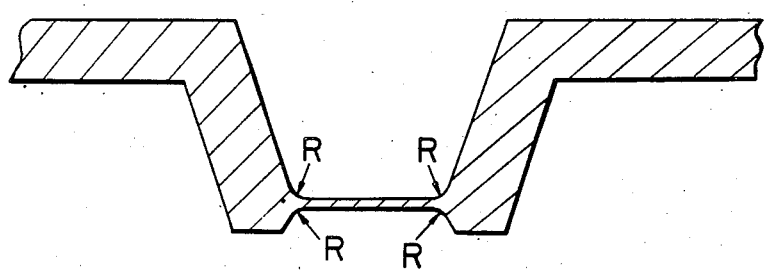
FIG. 23 is a cross-sectional view showing another embodiment.

FIG. 23 shows still another modification in which the bending portion is connected with the solid portions by arcs so that stress concentration on the corners may be avoided.

In the foregoing the present invention has been explained by certain embodiments thereof, but it is to be understood that the present invention is not limited only to such embodiments.

For example, the mutual contact of the solid portions in the end area can be prevented not only by angled surfaces of the solid portions as explained before but also by forming the solid portions as complete recesses.

Also, the additional slack may be formed by any means that connects the mutually opposed solid portions and which is longer by some amount $a$ than the shortest distance between the solid portions.

What we claim is:

1. An original document cover for an original pressing apparatus, comprising a molded hinge, a flexible portion, having first and second end areas and a pair of solid portions mutually opposed across said flexible portion, said original document cover being foldable at said flexible portion between a first and a second position, said solid portions mutually abutting when said original document cover is folded at said flexible portion into said second position, wherein said solid portions are shaped and arranged so that they do not contact each other at said end areas of said flexible portion.

2. An original document cover according to claim 1, wherein said solid portions have end portions adjacent to said end areas of said flexible portion, and wherein said end portions of said solid portions are shaped to be spaced further apart from each other when said original document cover is in said first position than are other areas of said solid portions.

3. An original document cover according to claim 2, wherein said flexible portion has end faces and said end faces are shaped as arcs.

4. An original document cover for an original pressing apparatus, comprising a molded hinge, a flexible portion, having first and second end areas and a pair of solid portions mutually opposed across said flexible portion and having end faces adjacent said end areas, said solid portions mutually abutting when said original document cover is folded at said flexible portion, wherein said solid portions do not contact each other at said end areas and wherein said end areas include end faces which are recessed relative to said end faces of said solid portions.

5. An original document cover according to claim 4, wherein said end faces of said solid portions are shaped to be spaced further apart from each other when said original document cover is in said first position than are other areas of said solid portions.

6. An original document cover according to claim 5, wherein said recessed end faces of said flexible portion are shaped as arcs.

7. An original document cover according to claim 6, which is for use in a copier, and is capable of being maintained to stand open when folded at said flexible portion into said second position.

8. An original document cover for an original pressing apparatus, comprising a molded hinge, a flexible portion having first and second end areas, and a pair of solid portions mutually opposed across said flexible portion and having end areas adjacent said end areas of said flexible portion, said original document cover being foldable about said flexible portion between first and second positions; wherein said solid portions mutually abut when said original document cover is folded at said flexible portion into said second position, said solid portions do not contact each other at said end areas thereof, and said end areas of said flexible portion have additional slack compared to other areas of said flexible portion.

9. An original document cover according to claim 8, wherein said end areas of said solid portions are shaped so as to be spaced further apart from each other when said original document cover is in said first position than are other areas of said solid portions.

10. An original document cover according to claim 9, wherein said flexible portion has respective end faces adjacent said end areas thereof and said end faces of said flexible portion are shaped as arcs lying in the width direction of said flexible portion.

11. An original document cover for an original pressing apparatus, comprising a molded hinge, a flexible portion having first and second areas and end faces and a pair of solid portions having end faces adjacent to those of said flexible portion, said solid portions being mutually opposed across said flexible portion, wherein said solid portions mutually abut when said original document cover is folded at said flexible portion, and wherein said solid portions do not contact each other at said end areas thereof, said end areas of said flexible portion having additional slack compared to other areas of said flexible portion, and said end faces of said flexible portion being recessed relative to said end faces of said solid portions.

12. An original document cover according to claim 11, wherein said end areas of said solid portions are shaped so as to be spaced farther apart from each other when said original document cover is in said first position than are other areas of said solid portions.

13. An original document cover according to claim 12, wherein said additional slack is defined by said end areas of said flexible portion being curved into a bridge shape.

14. An original document cover according to claim 12, wherein said additional slack is defined by said end areas of said flexible portion being corrugated.

15. An original document cover according to claim 12, wherein said additional slack is defined by a respective conical slack formed in each said end area of said flexible portion.

16. An original document cover according to claim 15, wherein said recessed end faces of said flexible portion are shaped as arcs lying in the width direction of said flexible portion.

17. An original document cover according to claim 16, which is for use in a copier, wherein said original document cover is capable of being maintained in said second position to stand, when folded at said flexible portion, in a state wherein said solid portions contact each other.

18. An original document cover for an original pressing apparatus, comprising a molded hinge, a flexible portion having first and second end areas, and a pair of solid portions mutually opposed across said flexible portion and in which said solid portions mutually abut when said molded article is folded at said flexible portion, comprising additional slack in said end areas of said flexible portion compared to other areas of said flexible portion.

19. An original document cover according to claim 18, wherein said additional slack is defined by said end areas of said flexible portion being curved into a bridge shape.

20. An original document cover according to claim 18, wherein said additional slack is defined by said end areas of said flexible portion being corrugated.

21. An original document cover according to claim 18, wherein said additional slack is defined by a respective conical slack formed in each said end area of said flexible portion.

22. An original document cover for an original pressing apparatus, comprising a molded hinge, a flexible portion having first and second end areas and end faces, and a pair of solid portions mutually opposed across said flexible portion and having first and second end faces, and in which said solid portions mutually abut when said an original document cover is folded at said flexible portion, wherein said original document cover comprises additional slacks in said end areas of said flexible portion compared to other areas of said flexible portion, and wherein said end faces of said flexible portion are recessed relative to said end faces of said solid portions.

23. An original document cover according to claim 22, wherein said recessed end faces of said flexible portion are shaped as arcs lying in the width direction of said flexible portion.

24. An original document cover according to claim 23, wherein said original document cover is used in a copier.

* * * * *

UNITED STATES PATENT AND TRADEMARK OFFICE
CERTIFICATE OF CORRECTION

PATENT NO. : 4,636,065
DATED : January 13, 1987
INVENTOR(S) : SHINJI KANEMITSU, ET AL.

It is certified that error appears in the above-identified patent and that said Letters Patent is hereby corrected as shown below:

COLUMN 8

Line 23, "said an" should read --said--; and

Line 25, "slacks" should read --slack--.

Signed and Sealed this

Fourteenth Day of April, 1987

Attest:

DONALD J. QUIGG

Attesting Officer

Commissioner of Patents and Trademarks